United States Patent [19]

Haferl

[11] 4,088,931
[45] May 9, 1978

[54] PINCUSHION CORRECTION CIRCUIT
[75] Inventor: Peter Eduard Haferl, Adliswil, Switzerland
[73] Assignee: RCA Corporation, New York, N.Y.
[21] Appl. No.: 722,600
[22] Filed: Sep. 13, 1976
[30] Foreign Application Priority Data
    Nov. 25, 1975  United Kingdom ............... 48353/75
[51] Int. Cl.² .............................................. H01J 29/56
[52] U.S. Cl. .................................. 315/371; 315/408
[58] Field of Search ......................... 315/370, 371, 408
[56] References Cited
    U.S. PATENT DOCUMENTS
    3,946,274  3/1976  Dietz .................................... 315/371
    3,962,602  6/1976  Dietz .................................... 315/371

Primary Examiner—Maynard R. Wilbur
Assistant Examiner—T. M. Blum
Attorney, Agent, or Firm—Eugene M. Whitacre; Paul J. Rasmussen; William H. Meise

[57] ABSTRACT

A side pincushion correction circuit having an impedance circuit in series with the deflection coil. A controlled switch coupled in a branch of the impedance circuit is operated at times during the second half of the horizontal retrace interval which are progressively advanced during the first half of vertical interval and retarded during second half of vertical interval. Enhanced inside pincushion distortion correction is provided when the impedance circuit includes a capacitor coupled in series with the switch.

42 Claims, 5 Drawing Figures

PINCUSHION CORRECTION CIRCUIT

BACKGROUND OF THE INVENTION

This invention relates to a kinescope pincushion distortion correction circuit.

It is known in the art that side or East-West pincushion distortion of the raster on a kinescope such as utilized in a television receiver may be substantially eliminated by modulating the horizontal rate deflection current amplitude through the horizontal deflection coils by a substantially parabolic current component at a vertical scanning rate. Generally the desired modulation has been accomplished by passive currents in which a control or primary winding of a saturable reactor or transformer is energized by vertical rate energy and a secondary winding is placed in circuit with the horizontal deflection winding. The horizontal deflection current amplitude is modulated by the vertical deflection current such that the raster width is reduced at the top and bottom of the raster.

Another known arrangement for side pincushion distortion correction involves a capacitor coupled in parallel with the vertical deflection winding. As is disclosed in copending application Ser. No. 07161/75 for Peter E. Haferl and entitled "VERTICAL DEFLECTION SYSTEM", the capacitor is charged by energy from the horizontal retrace pulse under the control of switches. In both the passive saturable reactor circuits and in the switched vertical deflection circuit according to the aforementioned copending application, side pincushion correction is obtained by loading the high voltage transformer of the horizontal deflection system during the horizontal retrace time. In order to obtain correctly shaped side pincushion correction the loading of the high voltage transformer is modulated at the vertical deflection rate, as by the vertical deflection current. Thus, maximum loading occurs at the top and bottom of the picture and minimum loading occurs at the center of the picture.

The variable loading of the horizontal retrace pulse at the vertical rate results in the generation of a further pincushion distortion, known as inside pincushion distortion to distinguish from the outside or peripheral pincushion distortion ordinarily referred to. This further pincushion distortion occurs within the raster as a result of time modulation of the start of horizontal scan caused by the vertical rate loading. Increased trace duration resulting from time modulation of the horizontal retrace pulse at the top and bottom of vertical scan increases the portion of the resonant period of the deflection coil 26 with S correction capacitor 28 subtended during trace. Thus, the inside pincushion distortion appears in the region between the center line and the extreme left and right sides of the picture as an insufficient pincushion correction.

The amount of inside pincushion correction depends upon the geometry of the picture tube and on the amount of outside pincushion distortion requiring correction. With the advent of wide-angle large viewing screen picture tubes it has been found that the inside pincushion distortion may be objectionable to the point that correction is required.

A prior art arrangement for the solution of the inside pincushion correction problem, in addition to structure utilized for conventional pincushion correction, uses a separate saturable reactor or transductor in series with the horizontal deflection winding. The control winding of the saturable reactor is driven by a vertical deflection rate signal and modulates the inductance of the horizontal deflection circuit to correct for the change in "S" shaping and thereby correct the inside pincushion distortion. This prior art solution has disadvantages which include critical design of the saturable reactor, temperature dependence of the saturable reactor, cost of the saturable reactor, and a control range so limited as to often be insufficient to compensate for construction tolerances.

SUMMARY OF THE INVENTION

A pincushion correction circuit includes an impedance coupled in series with a horizontal deflection winding. The impedance circuit contains two branches, one of which is always in series with the deflection winding. The second branch of the impedance circuit is paralleled with the first branch by a controllable switch. The controllable switch is gated on at a time during the second half of the horizontal retrace interval. The time during the second half of the horizontal retrace interval at which the switch is gated on is progressively advanced during a first portion of the vertical scan interval and is progressively retarded during the second portion of the vertical scan interval.

DESCRIPTION OF THE INVENTION

Figure 1:
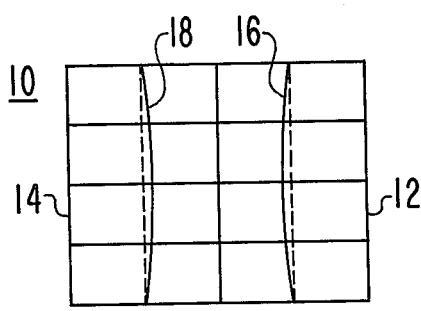
FIG. 1 is a depiction of a television raster showing inside pincushion distortion.

FIG. 1 illustrates inside pincushion distortion as it appears on a television raster displaying a crosshatch line pattern indicated generally by 10. The right and left sides of the crosshatch pattern are defined by vertical lines 12 and 14. Lines 12 and 14 are straight, indicating that the raster is East-West outside pincushion corrected by the invention in a manner described infra. Vertical grid lines 16 and 18 lying between the center and the sides of the raster are curved, as indicated by their departure from the straight dotted lines, indicating the presence of inside pincushion distortion.

Figure 2:
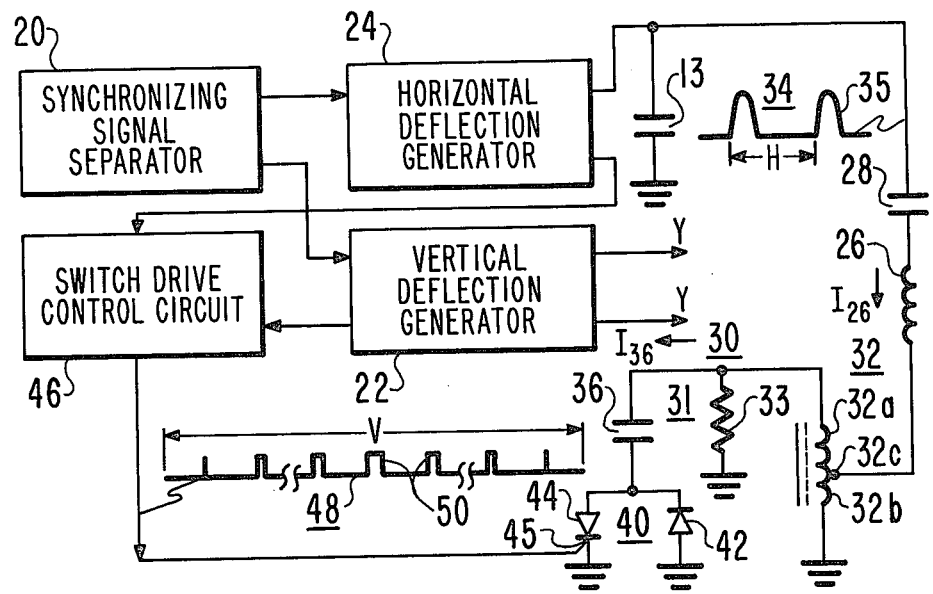
FIG. 2 is a diagram, partially in block and partially in schematic form of a portion of a television receiver embodying a pincushion correction circuit according to the invention.

FIG. 2 shows the deflection system of a television receiver including synchronizing signal separator 20 which receives composite video signals from the video detector, not shown. Separator 20 separates vertical synchronizing signals from the composite video and applies them to an input terminal of a vertical deflection generator 22. Vertical deflection generator 22 uses the vertical synchronizing signals to generate a vertical deflection current for application to a vertical deflection winding, not shown, connected to the output terminals Y-Y of generator 22.

Synchronizing signal separator 20 also separates horizontal synchronizing signals from the composite video and applies them to an input terminal of a horizontal deflection generator 24. Horizontal generator 24 processes the horizontal synchronizing signals to produce a generally sawtooth current through horizontal deflection winding 26. "S" shaping of the horizontal deflection current is produced by a capacitor 28 coupled in series with horizontal deflection coil 26. A horizontal scanning rate voltage waveform 34 having retrace pulses 35 appears across the series connected horizontal deflection winding and the S capacitor during operation. A retrace capacitor 13 is coupled from the junction of capacitor 28 and horizontal generator 24 to reference potential.

The horizontal deflection coil is also coupled in series with a pincushion correction circuit, in this embodiment specifically an inside-outside pincushion correction circuit, indicated generally by 30 and which includes an impedance circuit 31 and switch 40. Impedance circuit 31 has a first branch including inductor 32 coupled in parallel with capacitor 36 in a second branch. Inductor 32 has a tap 32c to which deflection coil 26 is coupled. Tap 32c divides inductor 32 into magnetically coupled upper winding 32a and lower winding 32b. A leakage inductance is associated with windings 32a and 32b. This leakage inductance decouples windings 32a and 32b so that currents having differing waveshapes can flow from tap 32c through the windings. Resistor 33 damps transformer 32 to prevent undesirable oscillations.

A controllable switch designated generally as 40 is coupled in series with the branch of the impedance circuit 31 containing capacitor 36. This controllable switch is a bidirectional thyristor-diode switch having a diode 42 coupled in parallel with a thyristor 44. Switch 40 can be an integrated thyristor-rectifier (ITR). The cathode of diode 42 and the anode of SCR 44 are coupled together and to capacitor 36, while the anode of diode 42 is coupled to the cathode of thyristor 44, and both are coupled to a reference potential.

Switch drive control circuit 46 is coupled to an output terminal of horizontal deflection generator 24 for receiving synchronizing information at the horizontal deflection rate. Such information is in the form of periodic horizontal retrace pulses similar to portion 35 of waveform 34. Switch drive control circuit 46 is also coupled to an output terminal of vertical deflection generator 22 for receiving vertical rate signals. Switch drive control circuit 46 processes the vertical and horizontal-rate synchronizing information and produces a repetitive sequence 48 of pulses 50 in a manner described infra. The sequence of pulses repeats at the vertical deflection rate.

Pulses 50 occur during the second half of each horizontal retrace pulse interval. The trailing edge of individual pulses 50 of pulse sequence 48 occur at the time of termination of the retrace pulse. At the beginning of each repetitive sequence 48, corresponding to the top of the vertical scan, the leading edge of each pulse 50 occurs immediately prior to the trailing edge, so the pulses 50 are short in duration. Pulses 50 occurring after the beginning of vertical scan but before center of vertical scan having leading edges which are progressively advanced in time relative to the trailing edge. At the center of vertical scan, corresponding to the middle of the sequence of pulses 48, the leading edge of the individual pulses 50 approach the time of the center of the retrace pulse 35.

From the center of the sequence 48 of pulses to the end of each sequence, which correspond to the middle and the bottom of vertical scan, respectively, the leading edges of the pulses 50 are progressively retarded relative to the time of center of retrace, until at bottom of vertical scan maximum retardation of the leading edge occurs, and the duration of a pulse 50 is again short. Accordingly it can be seen that the pulses 50 progressively increase in duration from beginning to middle of vertical scan, and progressively diminish in duration from the middle to the end of vertical scan. Repetitive sequence 48 of pulses 50 is coupled from switch drive control circuit 46 to gate 45 of thyristor 44.

Pincushion correction circuit 30 comprises a switch-variable impedance coupled in series with deflection winding 26. When switch 40 is open, pincushion correction circuit 30 presents the high inductive impedance of winding 32b in series with the deflection winding. When switch 40 is closed, circuit 30 presents a low capacitive impedance in series with deflection winding 26. This arrangement corrects for both inside and outside pincushion distortion.

The average impedance presented to deflection winding 26 by pincushion correction circuit 30 at the top and at the bottom of the raster is high because switch 40 is closed relatively late by pulse 50. At the center of the raster, corresponding to the center of the vertical scanning interval, the average impedance presented by pincushion correction circuit 30 is relatively low, because switch 40 is closed relatively early during the second half of the horizontal retrace interval.

At the top and at the bottom of the raster the late closing of switch 40 during the second half of the horizontal retrace interval and resulting high average impedance in series with deflection winding 26 reduces the deflection current $I_{26}$ flowing in deflection winding 26. This results in reduced horizontal trace width at the top and at the bottom of the raster, or outside pincushion distortion correction. Also, the increased impedance of deflection winding 26 in series with pincushion correction circuit 30 results in decreased loading of the horizontal retrace pulse. This decreased loading increases the duration of the horizontal retrace pulse, which tends to compensate for the change in "S" shaping caused by the time modulation of the horizontal retrace pulse resulting from the previously described prior art pincushion correction arrangements. Thus the variation in impedance of pincushion correction 30 appearing at tap 32c corrects for both inside and outside pincushion distortion.

During the second half of the horizontal retrace interval, retrace capacitor 13 supplies energy in the form of current $I_{26}$ to deflection winding 26 in series with pincushion correction circuit 30. During that portion of the second half of the horizontal retrace interval when switch 40 is open, no current can flow in the branch of impedance circuit 31 containing capacitor 36. Thus, the only path for deflection current $I_{26}$ is through the high inductive impedance of winding 32b. This results in a relatively high voltage appearing at tap 32c during the second half of the horizontal retrace interval, as shown by pulse 56 of FIG. 3e. At the instant when switch 40 is closed by application of a pulse 50 to gate 45 of thyristor 44, the impedance at tap 32c decreases abruptly as deflection current $I_{26}$ divides, with a portion of $I_{26}$ continuing to flow in winding 32b and the remainder flowing through winding 32a and capacitor 36 as $I_{36}$. This decrease in impedance results in an abrupt decrease in the voltage at tap 32c at the instant that pulse 50 is applied, as can be seen by the lagging edge of pulse 56 of tap 32c voltage waveform 54 of FIG. 3e.

Current begins to flow in the branch of impedance circuit 31 containing capacitor 36 at the instant that switch 40 closes. Current $I_{36}$ continues to increase during the remainder of the second half of the horizontal retrace interval. Since switch 40 closes relatively late at the top and bottom of the raster compared with the center of the raster, current $I_{36}$ at the end of the horizontal retrace interval is smaller at the top and at the bottom of the raster than at the center of the raster. Consequently, more of deflection current $I_{26}$ flows in the branch of impedance circuit 31 containing capacitor 36 at the center of the raster than at the top and at the bottom. This can be seen by reference to FIG. 3f, where the left and right sides of the waveform correspond to top and bottom of the raster respectively.

Due to the coupling between deflection current $I_{26}$ and capacitor 36 current $I_{36}$ attributable to transformer 32, deflection current $I_{26}$ and capacitor current $I_{36}$ increase and decrease in consonance during the trace interval. However, the relative magnitudes of $I_{26}$ and $I_{36}$ during trace are determined by the closing time of switch 40 during retrace. Because of the coupling between current $I_{26}$ and current $I_{36}$, capacitor current $I_{36}$ decreases to zero at the center of the horizontal trace interval, and begins to increase in the negative direction during the second half of the horizontal trace interval. During the second half of the horizontal trace interval, diode 42 of switch 40 conducts current $I_{36}$, and thyristor 44 is open. At the end of the horizontal trace interval, deflection current $I_{26}$ and capacitor 36 current $I_{36}$ go to zero, as can be seen by comparing deflection current waveforms 58 of FIG. 3g and current $I_{36}$ of FIG. 3f. Diode 42 opens, and thyristor 44 is open because no gating pulses are applied so switch 40 opens during the first half of the horizontal trace interval in preparation for a new cycle.

Capacitor 36 is in series with a portion $I_{36}$ of deflection current $I_{26}$ during the entire trace interval. Capacitor 36 causes S correction of current $I_{36}$. The amount of additional S correction of deflection current $I_{26}$ provided by capacitor 36 depends upon the proportion of capacitor current $I_{36}$ to the deflection current. At the top and at the bottom of the raster, capacitor current $I_{36}$ is relatively small because of late closing of switch 40. Consequently, capacitor 36 provides less S correction of deflection current $I_{26}$ at the top and at the bottom of raster than at the center of the raster, where early closing of switch 40 allows greater current flow in capacitor 36. Thus, control of switch 40 provides variation in S correction as a function of the vertical scan as shown by waveform 60 of FIG. 3g.

Adjustment of the size of capacitor 36 determines the nature of the S correction provided. When capacitor 36 is adjusted to make capacitor current $I_{36}$ of the same frequency as deflection current $I_{26}$, pincushion correction circuit 30 enhances outside pincushion distortion correction. When capacitor 36 is made smaller, so that capacitor current $I_{36}$ contains higher frequency components than deflection current $I_{26}$, inside pincushion distortion correction is provided. Capacitor 36 cannot be made arbitrarily small, because picture compression at the external line or left of the raster begins to accompany the pincushion distortion. This compression begins to occur where the conduction angle of capacitor current $I_{36}$ during trace is about 220°, corresponding to a frequency of 12KHz.

A particularly advantageous configuration of pincushion correction circuit 30 occurs when tap 32c is a center tap on transformer 32. In this arrangement, the impedance presented at tap 32c when switch 40 is closed is the reactance of capacitor 36 in series with the leakage inductance of transformer 32, because substantial cancellation of the flux in windings 32a and 32b occurs. In effect, the reactance of capacitor 36 appears in series with deflection winding 26 during trace with an apparent magnitude determined by the conduction time of switch 40.

Other embodiments of impedance circuit 31 will also provide pincushion correction. Outside pincushion correction can be provided by an impedance circuit consisting of an impedance such as a resistor, inductor or capacitor in series with the deflection winding paralleled by a control switch as described. Also, a further impedance could be placed in series with the switch to reduce switch current and/or avoid energy dissipation. As a further alternative, the further impedance might as in the impedance circuit 31 include two impedances, an inductor and a capacitor.

Figure 4:
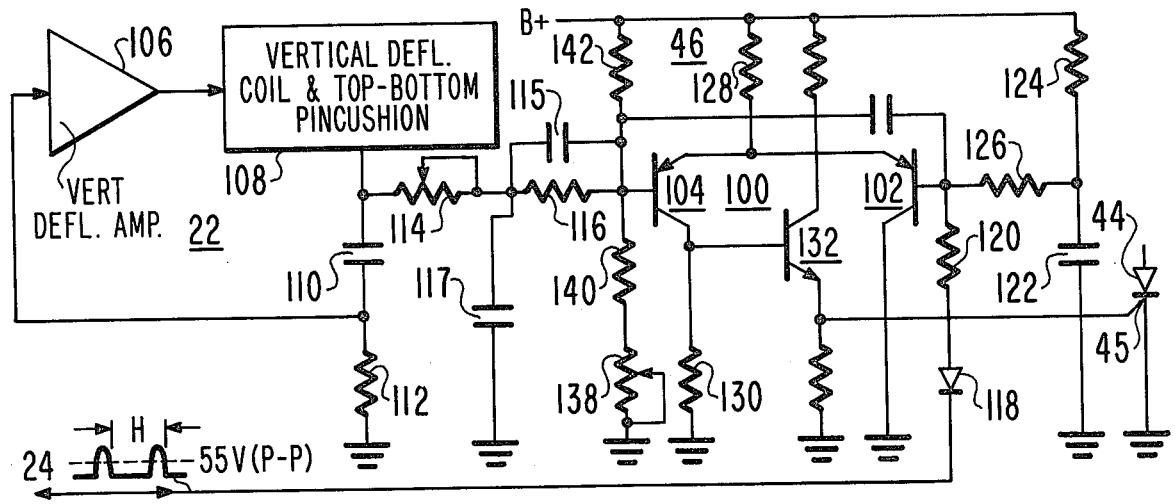
FIG. 4 is a schematic diagram of a first embodiment of a portion of the pincushion correction arrangement of FIG. 2.

FIG. 4 shows in schematic form a circuit suitable for use as switch drive control circuit 46 in conjunction with a conventional vertical deflection system. Circuit 46 compares a vertical-rate parabola with a horizontal-rate sawtooth to produce voltage waveform 48 having pulses 50 which progressively advance in time during the first half of vertical trace and which are progressively retarded during the second half of trace for application to switch gate 45 of FIG. 2.

Vertical deflection generator 22 comprises class B push-pull vertical deflection amplifier 106 and vertical deflection coil and top-bottom pin correction circuits 108 serially coupled with deflection coil coupling capacitor 110 and current sampling resistor 112. A feedback path is coupled from the junction of capacitor 110 and resistor 112 to the deflection amplifier 106.

A vertical-rate parabola appears across capacitor 110 and resistor 112 during operation. This vertical-rate parabola is coupled to the base of transistor 104 of differential amplifier 100 of switch drive control circuit 46 by way of a pincushion amplitude control resistor 114 and resistor 116.

Horizontal-rate retrace pulses 35 are coupled to the base of transistor 102 of differential amplifier 100 from horizontal deflection generator 24 by way of diode 118 and resistor 120. The base of transistor 102 is also coupled to a sawtooth forming capacitor 122 and a charging resistor 124 by way of a pedestal forming resistor 126.

In operation during the horizontal trace interval, diode 118 conducts, thereby maintaining transistor 102 conductive and capacitor 122 discharging. Transistor 104 is nonconductive because of bias by resistor 128. With transistor 104 nonconductive, no voltage appears across resistor 130 for coupling through emitter follower transistor 132 to gate 45 of thyristor 44.

Figure 3:
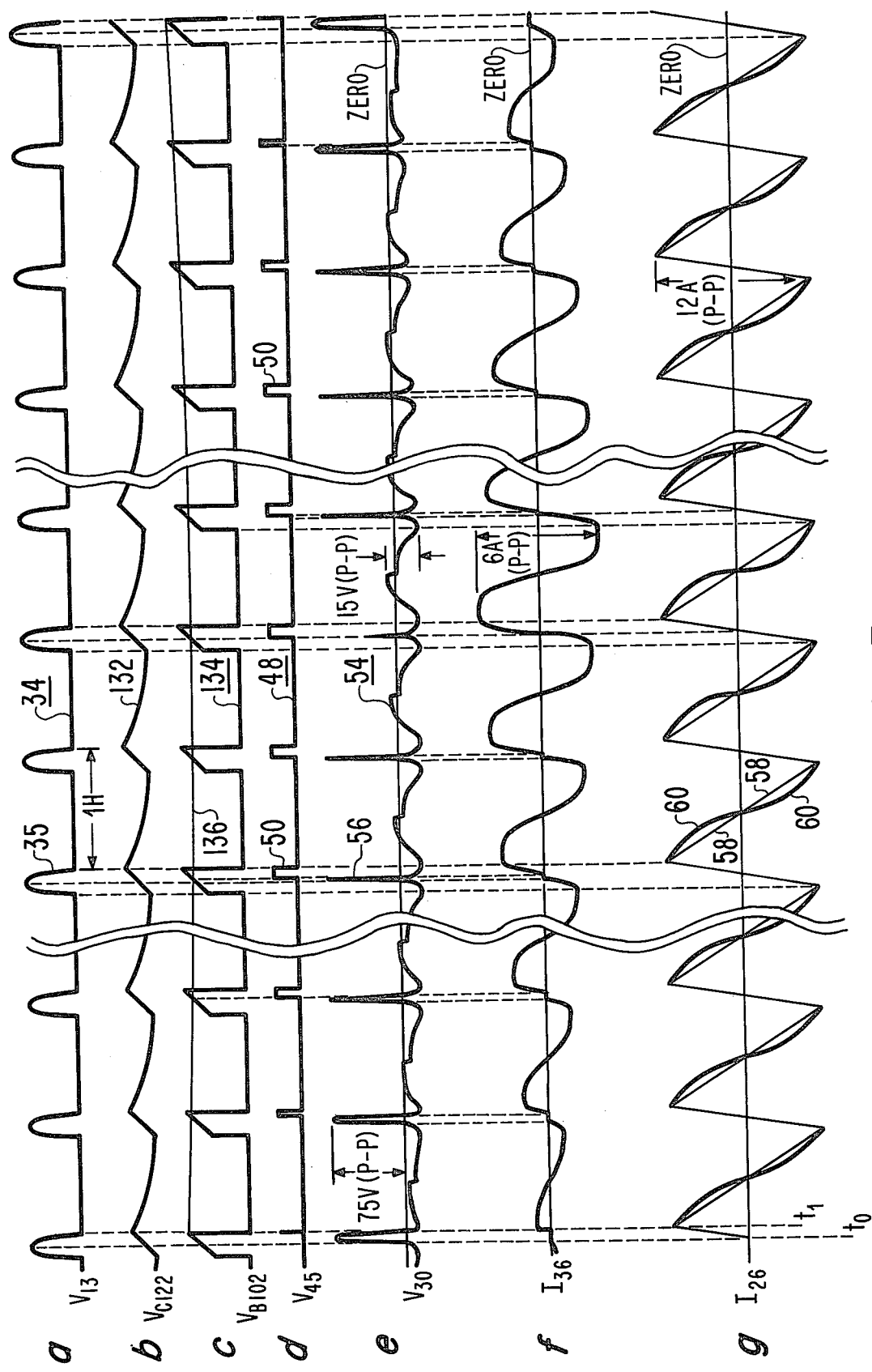
FIG. 3 shows voltage and current waveforms occurring in the pincushion correction arrangement of FIG. 2 during operation.

During the horizontal retrace interval, the positive-going voltage pulses coupled to the cathode of diode 118 render it nonconductive. This opens the discharge path of capacitor 122, which then begins to charge as can be seen from voltage waveform 132 of FIG. 3b. Also, the constant current flow through resistor 126 stops due to nonconduction of diode 118 and the base voltage of transistor 102 rises abruptly. Referring now to FIG. 3c, the pulses occurring during the horizontal retrace period at the base of transistor 102 are shown generally by 134. Each individual voltage pulse consists of a pedestal created by resistor 126 and a superimposed ramp portion created by the charge of capacitor 122 through resistor 124.

FIG. 3c also shows a shallow parabola 136 which represents the voltage applied to the base of transistor 104 of differential amplifier 100 from vertical deflection generator 22. The parabola 136 intersects the ramp portion of pulses 134. When the parabola 136 is more negative than the pulses 134 applied to base 102, transistor 104 will turn on and provide an output pulse to thyristor 44 by way of emitter follower 132. When parabola 136 is more positive than pulses 134, there is no output to thyristor 44.

The most negative portion of parabola 136 occurs at the middle point of vertical trace. Consequently, the parabola will intersect the sawtooth and thereby provide a pulse 50 of FIG. 3d output at a time which is most advanced relative to the horizontal retrace pulses at the center of vertical scan. At the top and bottom of vertical scan, parabola 136 is most positive and intersects pulses 134 relatively late, producing a pulse 50 output of relatively short duration.

The points of intersection of parabola 136 with the pulses 134 can be adjusted by means of resistor 138. Resistor 138 adjusts the base bias of transistor 104, thereby shifting the parabola 136 relative to the pulses at the base of transistor 102. This in turn results in all the gating pulses 50 being advanced or delayed by the same amount, thereby causing a constant change of picture width. The change in picture width occurs when circuit 30 is dimensioned to provide a large pincushion correction, in which case raster correction does not require the entire interval of the second half of retrace. An offset of the vertical parabola moves the turn-on time of switch 40 within the second half of retrace, changing the energy in the deflection winding at start of trace. Resistor 140 in conjunction with resistor 142 sets the basic base bias for transistor 104.

Resistor 114 in conjunction with resistor 116 determines the magnitude of the vertical parabola 136 applied to the base of transistor 104. It should be noted that correction of trapezoidal distortion of the raster can be achieved by connecting a suitable capacitor 115 across resistor 116 or by connecting capacitor 117 from the junction of resistor 114 and 116 to ground. Connecting a capacitor across resistor 116 advances the phase of the vertical parabola at the base of transistor 104 while a capacitor from the junction of resistors 114 and 116 to ground delays the parabola. An advancing phase moves the point of maximum pincushion correction upward from the center of the raster towards the top, and phase delay moves the maximum point towards the bottom. This in turn results in trapezoidal correction.

Figure 5:
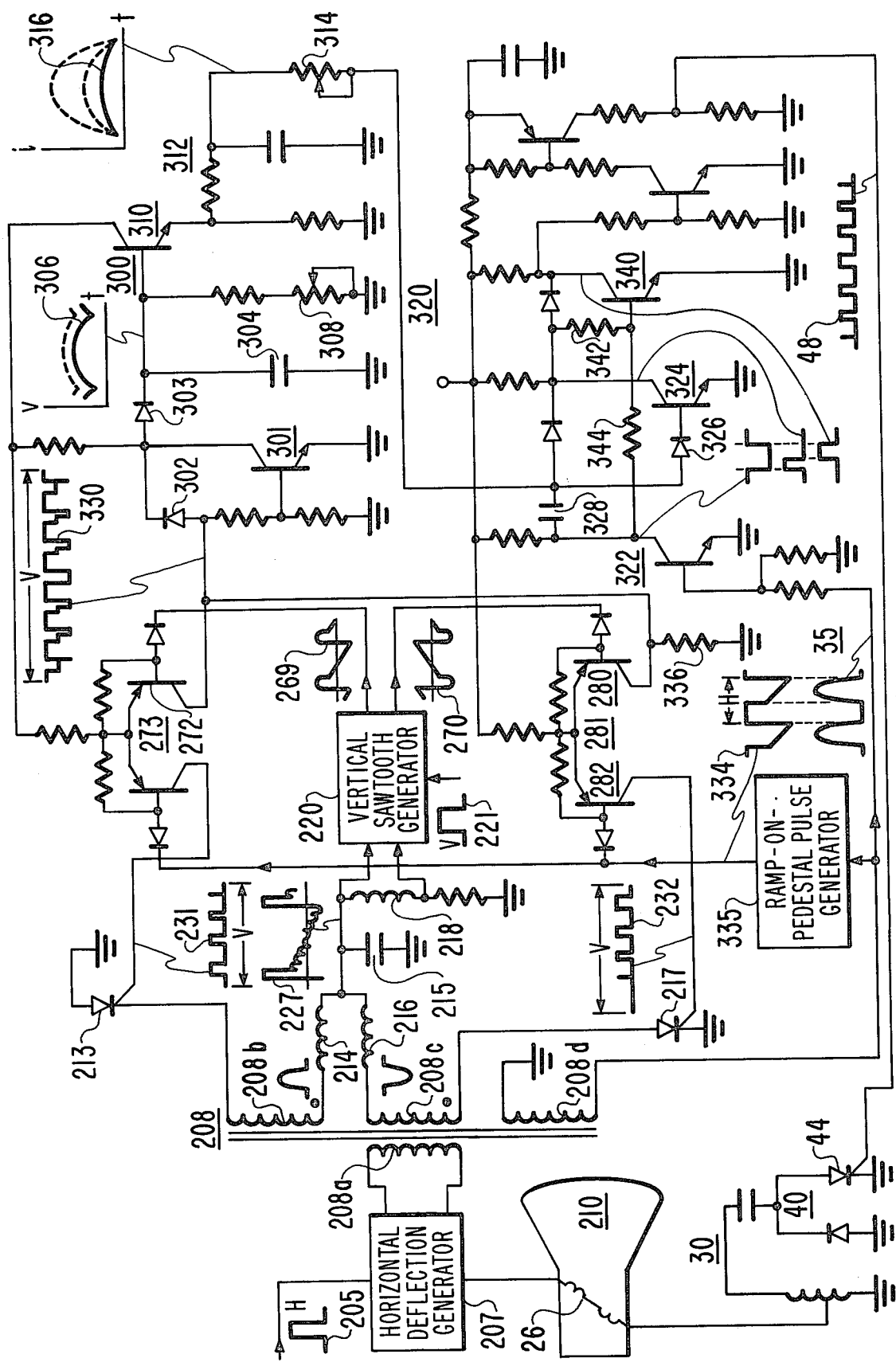
FIG. 5 is a schematic and block diagram of a second embodiment of a portion of the pincushion correction arrangement of FIG. 2.

Another embodiment of the switch drive control circuit 46 for use in conjunction with a switched vertical deflection circuit such as that described in the aforementioned copending application is shown in FIG. 5. Switch drive control circuit 46 of FIG. 2 includes a parabola generator designated generally by 300 and a pulse generator designated generally by 320 as shown in FIG. 5. Parabola generator 300 and pulse generator 320 receive retrace pulses 35 from horizontal deflection generator 207 by way of transformer winding 208d and a pulse waveform 330 from the switched vertical deflection modulator circuit. Pulse generator 320 produces switch gate voltage waveform 48 for application to thyristor 44 of pincushion correction circuit 30.

As described in the aforementioned copending application, horizontal deflection generator 207 responds to horizontal synchronizing pulses 205 to produce a generally sawtooth horizontal deflection current in deflection winding 26 deployed about kinescope 210. Winding 26 is serially coupled with pincushion correction circuit 30 as described in conjunction with FIG. 2. Horizontal deflection generator 207 also drives horizontal output transformer 208. Transformer 208 has two secondaries, 208b and 208c, which produce oppositely-poled horizontal retrace pulses. Thyristor 213 coupled in series with transformer secondary 208b and with coil 214 begins to charge sawtooth capacitor 215 during each horizontal retrace pulse. Thyristor 213 is gated on for a maximum interval of each horizontal retrace pulse at the top of vertical scan. During the first or top half of scan, gating pulses 231 applied to the gate of thyristor 213 by top-of-scan pulse width modulator 273 progressively decrease the conduction time of thyristor 213.

Consequently, a decreasing voltage waveform 227 appears across capacitor 215.

During the second half of vertical scan, bottom-of-scan pulse width modulator 281 gates thyristor 217 with gating pulses 232 which progressively increase in duration. Consequently, during the second half of vertical scan, thyristor 217 in conjunction with transformer secondary 208c and coil 216 charge capacitor 215 with an increasing negative voltage. The voltage 227 appearing across capacitor 215 is integrated by vertical deflection coil 218 to form a substantially sawtooth deflection current.

Vertical sawtooth generator 220 responds to vertical synchronizing pulses 221 and to the current through deflection coil 218 to produce oppositely poled vertical-rate waveforms 269 and 270. Modulators 273 and 281 are driven by voltages 269 and 270 from generator 220. A ramp-on-pedestal pulse voltage waveform generator 335 which may be similar to the ramp-pedestal pulse generator described in detail in conjunction with FIG. 4 is driven by horizontal retrace pulses 35 from transformer secondary 208d. Modulators 273 and 281 have second inputs driven by voltage waveform 334 from generator 335. Pulses 334 are similar to inverted pulses 134 of FIG. 3c. Pulse width modulators 273 and 281 produce as first output signals the progressively varying width pulses 231 and 232 respectively for application to thyristors 213 and 217.

Pulse width modulators 273 and 281 have second output signals, obtained from transistors 272 and 280 respectively, the collectors of which are coupled through resistor 336 to ground. A voltage 330 representing the sum of the output voltage waveforms of transistors 272 and 280 appears as an input waveform to parabola generator 300.

Pulse waveform 330 is applied to normally saturated amplifier transistor 301. The tips of the pulses 330 bring transistor 301 out of saturation, creating positive pulses at the collector of transistor 301. A diode 302 coupled from collector to base of transistor 301 improves the transient response of transistor 301. A detector diode 303 couples the positive pulse output of transistor amplifier 301 to an integrating capacitor 304. A parabolic voltage 306 appears across capacitor 304 representing the integrated output of transistor 301, with the peak of the parabola occurring at the center of vertical scan in response to the maximum duration of the pulse tips of waveform 330. Variable resistor 308 adjusts the rate of discharge of integrating capacitor 304. The vertical rate parabolic waveform 306 is coupled from capacitor 304 by an emitter follower designated generally as 310. A low pass filter designated generally as 312 attenuates horizontal-frequency currents of the parabolic waveform 306. A shape control resistor 314 couples a parabolically varying current 316 to pulse processor 320 in response to parabolic voltage 306.

Pulse processor 320 receives horizontal retrace pulses 35 from transformer secondary winding 208d for application to the base of inverting amplifier 322. The negative-going pulse output of inverting amplifier 322 is applied to the base of transistor 324 by way of capacitor 328 and diode 326.

Transistor 324 also has applied to its base the parabolically varying current waveform 316. Current waveform 316 tends to maintain transistor 324 conductive between horizontal retrace pulses. Upon application of a negative-going horizontal rate pulse from inverter 322, transistor 324 ceases conduction for a period dependent upon the time required for current 316 to charge capacitor 328 to again forward-bias transistor 324. The nonconduction period of transistor 324 will be least in the center of vertical scan at which time current 316 is greatest, and nonconduction of transistor 324 will have the greatest duration at top and bottom of vertical scan.

The positive-going pulse output of transistor 324 is taken from the collector and applied to the base of transistor 340 through resistor 342. Another input signal to the base of transistor 340 is taken from the output terminal of amplifier 322 through resistor 344. A positive pulse output at the collector of transistor 340 occurs only when the output signals of both amplifier 322 and transistor 324 are low. A pair of inverting amplifiers couples the pulse output of transistor 340 to the gate of thyristor 44.

Since the lagging edge of the pulse output of amplifier 322 occurs at the end of the retrace pulse interval, the output pulse from transistor 340 ends at the end of retrace pulse interval. The pulse output of transistor 340 has a duration which is maximum at center of vertical scan and minimum at top and bottom of vertical scan.

The described pincushion correction circuit simultaneously corrects inside East-West pincushion distortion and outside East-West pincushion distortion. It is also highly efficient because loading of the horizontal output transformer is avoided. The described circuit may be used in conjunction with conventional pincushion correction circuits.

When used in conjunction with the switched mode vertical deflection system as disclosed in the aforementioned copending application, the disclosed pincushion correction circuit is particularly advantageous. While the switched mode vertical deflection circuit provides side pincushion distortion by loading of the horizontal retrace transformer, in some applications it is necessary to provide for simultaneous conduction of the control switches such as 213 and 217 of FIG. 5 at center of vertical scan in order to achieve sufficient inherent pincushion correction. Such simultaneous conduction of switches 213 and 217 creates a dissipative current path for the horizontal retrace energy. By use of the present invention in conjunction with the switched mode vertical deflection system the dissipative energy loss is avoided and a very low total power consumption is achieved.

The following is a listing of values of circuit elements providing pincushion correction for a 110° largescreen kinescope such as the RCA Corporation model number A67-610X:

| | |
|---|---|
| L26 | 0.28mH |
| L32 | core φ10x 45mm, N22 each half one layer of 34 turns of 0.8mm Cu wire, 60μH each half, leakage 1μH. |
| C36 | 1 μF |
| C122 | 0.015 μF |
| C304 | 4700pF |
| C328 | 470pf |
| R33 | 680 |
| R114,116,120,124 | 4K7 |
| R126 | 1K |
| R128 | 3K3 |
| R130 | 10K |
| R138 | 4K7 variable |
| R140 | 3K9 |
| R142 | 4K7 |
| R308 | 100K |
| R314 | 22K |
| R342,344 | 4K7 |

For the above values and kinescope, current components in the deflection winding due to resonance of the S capacitor and deflection winding were observed at about 6.5 kHz, while components due to the pincushion correction circuit were observed to be at about 12 kHz.

What is claimed is:

1. A pincushion correction circuit for a kinescope deflection apparatus including horizontal and vertical deflection generator systems, comprising:
   a horizontal deflection winding coupled to the horizontal deflection generator system for accepting scanning current therefrom;
   an impedance circuit for presenting an impedance between first and second terminals and further including a third terminal, and first coupling means for coupling said first terminal to said third terminal;
   second means for serially coupling said first and second terminals of said impedance circuit with said deflection winding;
   controllable switch means including a control electrode and a controlled current path coupled between said second and third terminals;
   control means coupled to the horizontal and vertical deflection generator systems and to said control electrode for operating said controllable switch means at a time during the second half of the horizontal retrace interval which time is progressively advanced during a first portion of the vertical scan interval and which is progressively retarded during a second portion of the vertical scan interval for altering said scanning current in a manner to reduce pincushion distortion.

2. A pincushion correction circuit in accordance with claim 1 wherein said first coupling means comprises a direct connection.

3. A pincushion correction circuit in accordance with claim 1 wherein said impedance circuit comprises first inductance means coupled between said first and second terminals.

4. A pincushion correction circuit in accordance with claim 3 wherein said first coupling means comprises capacitance means coupled between said first and third terminals.

5. A pincushion correction circuit according to claim 3 wherein said first coupling means comprises:

capacitance means;

second inductance means;

means for serially coupling said capacitance means with said second inductance means; and means for coupling the serial combination of said capacitance means and said second inductance means between said first and third terminals.

6. A pincushion correction circuit according to claim 3 wherein said coupling means comprises second inductance means coupled between said first and third terminals.

7. A pincushion correction circuit according to claim 6 further comprising means for magnetically coupling said first inductance means with said second inductance means.

8. A pincushion correction circuit according to claim 7 further comprising capacitance means serially coupled with said second inductance means.

9. A pincushion correction circuit according to claim 8 wherein said first and second inductance means have substantially the same self-inductance.

10. A pincushion correction circuit according to claim 1 wherein said controllable switch means comprises a controllable rectifier including said control electrode and said controllable current path, a unidirectional current conducting device, and wherein said controllable current path is coupled in parallel with said unidirectional current conducting device.

11. A pincushion correction circuit according to claim 10 wherein the anode of said unidirectional current conductive device is coupled to the cathode of said controllable rectifier and the cathode of said unidirectional current conducting device is coupled to the anode of said controllable rectifier.

12. A pincushion correction circuit according to claim 1 wherein said control means comprises gating pulse generator means coupled to said controllable switch and to the horizontal and vertical deflection generator systems for producing repetitive switch gating pulses during the second half of each horizontal retrace pulse interval, said gating pulses terminating substantially at the termination of said horizontal retrace pulse and initiating at a time which is progressively advanced during a first portion of the vertical scan interval and progressively retarded during a second portion of the vertical scan interval.

13. A pincushion correction circuit according to claim 12 wherein said gating pulse generator means comprises:

parabola generating means coupled to the vertical deflection generator system for generating a parabolic signal at the vertical deflection rate;

means coupled to the horizontal deflection generator system for generating a horizontal rate signal during the horizontal retrace pulse period;

modulating means coupled to said horizontal rate signal generating means and to said parabolic signal generating means for generating a horizontal rate pulse width modulated by said parabolic signal; and gating means coupled to said horizontal rate signal generating means and to said modulating means for generating switch gating pulses representative of the absence of said horizontal rate signal and of said horizontal rate pulse.

14. A pincushion correction circuit according to claim 12 wherein said gating pulse generator means comprises: parabola generating means for generating a parabolic signal at the vertical deflection rate; means for generating a horizontal rate signal during the horizontal retrace pulse interval; and comparator means coupled to said parabola generator means and to said horizontal rate signal generating means for producing said repetitive gating pulses.

15. A pincushion correction circuit according to claim 14 wherein said comparator means comprises: differential amplifier amplitude comparison means having a first and a second input;

said first input being coupled to said parabola generating means; and said second input being coupled to an output of said horizontal rate signal generating means and said horizontal rate signal comprises a ramp.

16. A pincushion correction circuit for a kinescope deflection apparatus including horizontal and vertical deflection generator systems, comprising:

a horizontal deflection winding coupled to the horizontal deflection generator system for accepting scanning current therefrom;

an impedance circuit including a capacitor coupled in parallel with an inductor;

means for serially coupling said impedance circuit with said deflection winding;

controllable switch means including a control electrode and a controlled current path serially coupled with a branch of said impedance circuit; and control means coupled to the horizontal and vertical deflection generator and to said control electrode for operating said controllable switch means at a time during the second half of the horizontal retrace interval which time is progressively advanced during a first portion of the vertical scan interval and which is progressively retarded during a second portion of the vertical scan interval for altering said scanning current in a manner to reduce pincushion distortion.

17. A pincushion correction circuit according to claim 16 wherein said controllable switch is serially coupled in the capacitive branch of said impedance circuit.

18. A pincushion correction circuit according to claim 17 wherein the inductive branch of said impedance circuit comprises an autotransformer.

19. A pincushion correction circuit according to claim 18 wherein said controllable switch comprises a controllable rectifier, a unidirectional current conducting device and having said controllable current path coupled in parallel with said unidirectional current conducting device.

20. A pincushion correction circuit according to claim 19 wherein the anode of said unidirectional current conducting device is coupled to the cathode of said controllable rectifier and the cathode of said unidirectional current conducting device is coupled to the anode of said controllable rectifier.

21. A pincushion correction circuit according to claim 16 wherein said control means comprises gating pulse generator means coupled to said controllable switch and to the horizontal and vertical deflection generator systems for producing repetitive switch gating pulses during the second half of each horizontal retrace pulse interval, said gating pulses terminating substantially at the termination of said horizontal retrace pulse and initiating at a time which is progressively advanced during a first portion of the vertical scan interval and progressively retarded during a second portion of the vertical scan interval.

22. A pincushion correction circuit according to claim 21 wherein said gating pulse generator means comprises:
parabola generating means coupled to the vertical deflection generator system for generating a parabolic signal at the vertical deflection rate;
means coupled to the horizontal deflection generator system for generating a horizontal rate signal during the horizontal retrace pulse period;
modulating means coupled to said horizontal rate signal generating means and to said parabolic signal generating means for generating a horizontal rate pulse width modulated by said parabolic signal; and
gating means coupled to said horizontal rate signal generating means and to said modulating means for generating switch gating pulses representative of the absence of said horizontal rate signal and of said horizontal rate pulse.

23. A pincushion correction circuit according to claim 21 wherein said gating pulse generator means comprises: parabola generating means for generating a parabolic signal at the vertical deflection rate; means for generating a horizontal rate signal during the horizontal retrace pulse interval; and
comparator means coupled to said parabola generator means and to said horizontal rate signal generating means for producing said repetitive gating pulses.

24. A pincushion correction circuit according to claim 23 wherein said comparator means comprises: differential amplifier amplitude comparison means having a first and a second input;
said first input being coupled to said parabola generating means; and
said second input being coupled to an output of said horizontal rate signal generating means and said horizontal rate signal comprises a ramp.

25. A television kinescope deflection apparatus comprising:
a vertical deflection generator coupled to a vertical deflection coil for producing vertical scanning current therethrough;
a horizontal deflection generator system for generating horizontal rate current;
a horizontal deflection winding coupled to said horizontal deflection generator for accepting horizontal rate current therefrom for scanning;
impedance means;
controllable switch means; first coupling means for coupling said horizontal deflection winding with a first terminal of said impedance means so as to form a series circuit, said impedance means having a second terminal remote from said first terminal; second coupling means coupling a first end of the controlled current path of said controllable switch means with said first terminal, and third coupling means for coupling the other end of the controlled current path of said controllable switch means with said second terminal; and
control means coupled to said vertical and to said horizontal deflection generator systems and to said controllable switch means for operating said controllable switch means at a time during the horizontal retrace interval which is progressively advanced during a first portion of the vertical scan interval and which is progressively retarded during a second portion of the vertical scan interval for altering said scanning current in a manner to reduce pincushion distortion.

26. A television kinescope deflection apparatus according to Claim 25
wherein
said control means closes said controllable switch means at a time during the horizontal retrace interval which is progressively advanced during the first half of the vertical scan interval and progressively retarded during the second half of the vertical scan interval.

27. A television kinescope deflection apparatus according to claim 26 wherein said impedance means comprises first inductance means coupled between said first and second terminals.

28. A television kinescope deflection apparatus according to claim 27 wherein said second coupling means comprises capacitance means coupling said first terminal of said impedance means to said first end of said controllable switch means.

29. A television kinescope deflection apparatus according to claim 27 wherein said second coupling means comprises second inductance means coupling said first terminal of said impedance means to said first end of said controllable switch means.

30. A television kinescope deflection apparatus in accordance with claim 27 wherein said second coupling means comprises second inductance means coupling said first terminal of said impedance means to said first end of said controllable switch means and further comprising magnetic coupling means for magnetically coupling said first inductance means with said second inductance means.

31. A television kinescope deflection apparatus according to Claim 27 wherein said second coupling means comprises capacitance means and second inductance means.

32. A television kinescope deflection apparatus according to claim 31 wherein said first and second inductance means have substantially the same self-inductance.

33. A television kinescope deflection apparatus according to claim 31 wherein said capacitance means and said second inductance means are serially coupled.

34. A television kinescope deflection apparatus according to claim 31 further comprising magnetic coupling means for magnetically coupling said first and second inductance means.

35. A television kinescope deflection apparatus according to claim 31 wherein said first and second inductance means are windings of an autotransformer.

36. A television kinescope deflection apparatus in accordance with claim 25 wherein said controllable switch means comprises a controllable rectifier including a control electrode and a controllable current path, a unidirectional current conducting device, and wherein said controllable current path is coupled in parallel with said unidirectional current conducting device.

37. A television kinescope deflection apparatus according to Claim 36 wherein the anode of said unidirectional current conductive device is coupled to the cathode of said controllable rectifier and the cathode of said unidirectional current conducting device is coupled to the anode of said controllable rectifier.

38. A television kinescope deflection apparatus according to Claim 25 wherein said control means comprises gating pulse generator means coupled to said controllable switch and to said horizontal and vertical deflection generators for producing repetitive switch gating pulses, said gating pulses terminating substantially at the termination of said horizontal retrace pulse.

39. A television kinescope deflection apparatus according to Claim 38 wherein said gating pulse generator means comprises: parabola generating means coupled to the vertical deflection generator for generating a parabolic signal at the vertical deflection rate; means coupled to said horizontal deflection generator system for generating a horizontal rate signal during said horizontal ratrace pulse period; modulating means coupled to said horizontal rate signal generating means and to said parabolic signal generating means for generating a horizontal rate pulse width-modulated by said parabolic signal.

40. A television kinescope deflection apparatus according to Claim 39 wherein said modulating means comprises: comparator means coupled to said parabola generator means and to said horizontal rate signal generating means for producing said repetitive gating pulses.

41. A television kinescope deflection apparatus according to Claim 40 wherein said comparator means comprises: differential amplifier amplitude comparison means having a first and a second input; said first input being coupled to said parabola generating means; and said second input being coupled to an output of said horizontal rate signal generating means and wherein said horizontal rate signal comprises a ramp.

42. A television kinescope deflection apparatus comprising: a vertical deflection generator coupled to a vertical deflection coil for producing vertical scanning current therethrough; a horizontal deflection generator system for generating horizontal rate current; a horizontal deflection winding coupled to said horizontal deflection generator for accepting horizontal rate current therefrom for scanning; impedance means; controllable switch means; means coupling said impedance means and said controllable switch means in series with said deflection winding for defining a path for said horizontal rate current; control means coupled to said vertical and to said horizontal deflection generator systems and to said controllable switch means for operating said controllable switch means at a time during the horizontal retrace interval which is progressively advanced during the first half of the vertical scan interval and which is progressively retarded during the second half of the vertical scan interval for altering said scanning current in a manner to reduce pincushion distortion.

* * * * *

UNITED STATES PATENT OFFICE
CERTIFICATE OF CORRECTION

PATENT NO. : 4,088,931

DATED : May 9, 1978

INVENTOR(S) : Peter Eduard Haferl

It is certified that error appears in the above-identified patent and that said Letters Patent are hereby corrected as shown below:

Column 1, line 14, that portion reading "currents" should read -- circuits --.

Signed and Sealed this

Twenty-second Day of August 1978

[SEAL]

Attest:

RUTH C. MASON
Attesting Officer

DONALD W. BANNER
Commissioner of Patents and Trademarks